United States Patent [19]

Mochizuki et al.

[11] Patent Number: 4,933,817
[45] Date of Patent: Jun. 12, 1990

[54] ILLUMINATING DEVICE

[75] Inventors: Noritaka Mochizuki, Yokohama; Chikara Jin, Tokyo, both of Japan

[73] Assignee: Canon Kabushiki Kaishi, Tokyo, Japan

[21] Appl. No.: 205,003

[22] Filed: Jun. 3, 1988

Related U.S. Application Data

[63] Continuation of Ser. No. 865,941, May 19, 1986, abandoned, which is a continuation of Ser. No. 590,754, Mar. 19, 1984, abandoned.

[30] Foreign Application Priority Data

Mar. 30, 1983 [JP] Japan ................................. 58-54873

[51] Int. Cl.⁵ .......................... G03B 27/52; F21V 7/00
[52] U.S. Cl. ...................... 362/33; 362/247; 362/296; 362/297; 355/67; 355/71; 350/237
[58] Field of Search ............... 362/33, 296, 297, 298, 362/262, 268, 31, 32, 302, 247, 253; 350/443, 320, 630, 237; 355/67, 71

[56] References Cited

U.S. PATENT DOCUMENTS

| 3,508,809 | 4/1970 | Wilder et al. | 362/297 |
|---|---|---|---|
| 3,586,849 | 6/1971 | Starkweather et al. | 362/297 |
| 3,752,974 | 8/1973 | Baker et al. | 362/31 |
| 3,914,593 | 10/1975 | Laribe | 362/297 |
| 4,041,344 | 8/1977 | Lagiusa | 362/296 |
| 4,059,916 | 11/1977 | Tachihara et al. | 362/31 |
| 4,095,881 | 6/1978 | Maddox | 362/298 |
| 4,220,982 | 9/1980 | Martino | 362/33 |
| 4,240,692 | 12/1980 | Winston | 350/630 |
| 4,441,783 | 4/1984 | Houghton et al. | 362/297 |
| 4,712,885 | 12/1987 | Dawson et al. | 350/443 |

FOREIGN PATENT DOCUMENTS

| 0217720 | 2/1907 | Fed. Rep. of Germany | 350/630 |
|---|---|---|---|
| 1025462 | 4/1953 | France | 362/32 |
| 0073092 | 6/1979 | Japan | 350/630 |
| 0747476 | 4/1956 | United Kingdom | 362/33 |

Primary Examiner—Parshotam S. Lall
Assistant Examiner—V. Trans
Attorney, Agent, or Firm—Fitzpatrick, Cella, Harper & Scinto

[57] ABSTRACT

An illuminating device comprises a light-condensing block forming a transparent pillar member having a greater refractive index than the ambience and having a cross-sectional shape forming a part of an ellipse, and a light source disposed axially of the pillar member in a focal plane containing one focus of the ellipse for illuminating an object through the light-condensing block.

5 Claims, 2 Drawing Sheets

ILLUMINATING DEVICE

This application is a continuation of application Ser. No. 855,941 filed May 19, 1986, now abandoned, which is a continuation of original application USSN 590,754, filed Mar. 19, 1984, now abandoned.

BACKGROUND OF THE INVENTION

1. Field of the Invention

This invention relates to a compact and easily manufacturable illuminating device suitable for the illumination of an original in an original reading optical system used in a copying apparatus, a facsimile apparatus or the like.

2. Description of the Prior Art

In a copying apparatus or a facsimile apparatus, formation or reading of the image of an original is effected while the original is scanned in at least one direction and therefore, an illuminating device capable of efficiently illuminating a linear particular area has been required and, to this end, an illuminating device, as shown in FIG. 1 of the accompanying drawings has been used. Referring to FIG. 1 which is a cross-sectional view, a linear light source 16 and a reflecting mirror 17 extend in a direction perpendicular to the plane of the drawing sheet. The linear light source 16 is, for example, a fluorescent tube having an elongated light-emitting portion. The reflecting mirror 17, as shown, has its reflecting surface of elliptical cross-section continuous in a direction perpendicular to the plane of the drawing sheet. The light emitted from the linear light source 16 is reflected by the reflecting surface of the reflecting mirror 17, is converged and illuminates only a linear particular area.

However, in the conventional illuminating device as described above, the reflecting mirror has been formed by plating the inner surface of a metal plate or the like, and this has led to a disadvantage that it is difficult to bend the metal plate into a distortion-free elliptical cross-section as shown and its productivity is poor. Also, in the combination of the reflecting mirror with the linear light source 16, it has been necessary to spatially adjust its position and fix it so that the light-emitting portion of the light source 16 in its cross-section is coincident with one focal point of the elliptical cross-section of the reflecting mirror 17, and this also has led to a disadvantage that the assembling process becomes complicated.

SUMMARY OF THE INVENTION

It is an object of the present invention to provide an illuminating device which is capable of efficiently illuminating a linear area and which is easy to work and assemble and is high in productivity.

The present invention achieves the above object by an illuminating device comprising a light-condensing block forming a transparent pillar member having a greater refractive index than the ambience and having a cross-sectional shape forming a part of an ellipse, and a light source disposed axially of the pillar member in a focal plane containing one focal point of the ellipse for illuminating an object through the light-condensing block.

The invention will become more fully apparent from the following detailed description thereof taken in conjunction with the accompanying drawings.

DESCRIPTION OF THE PREFERRED EMBODIMENT

Figure 1:
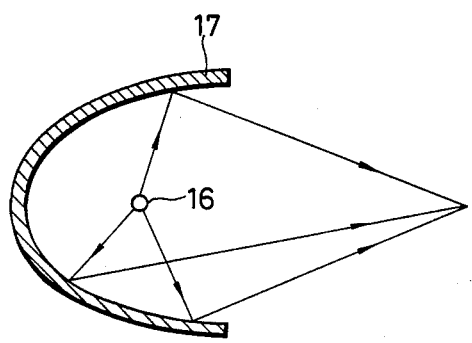
FIG. 1 is a cross-sectional view showing an example of the illuminating device according to the prior art.
Figure 2:
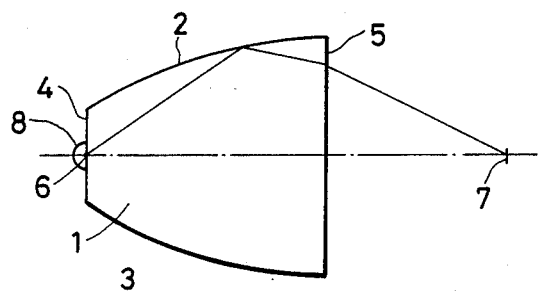
FIG. 2 is a cross-sectional view showing an example of the construction of an illuminating device according to the present invention.

The basic concept of the present invention will hereinafter be described by reference to FIG. 2. Reference numeral 1 designates a light-condensing block formed of a transparent material having a refractive index greater than 1. The light-condensing block 1 extends as a pillar member in a direction perpendicular to the plane of the drawing sheet, and its transverse cross-section is such that as shown, the outer peripheral portions 2 and 3 thereof are a part of an ellipse and the end portions 4 and 5 thereof form straight lines. Reference numeral 6 designates a first focal point of an ellipse lying on the end portion 4, and reference numeral 7 denotes a second focal point of the ellipse. The exterior of the light-condensing block is surrounded by a medium having a refractive index 1, i.e., the air. The light from a light source 8 placed at the first focal point 6 on the input end surface 4 is totally reflected by the elliptical outer peripheral surfaces 2 and 3 and is converged at the second focal point 7. If the light source 8 is made into a long one extending axially of the pillar member of the light-condensing block 1, there will be obtained a linear high illumination illuminating area extending axially of the pillar member through the second focus 7.

Figure 3:
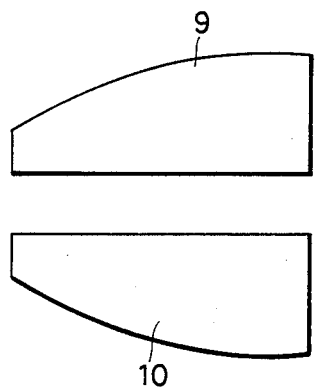
FIG. 3 is a cross-sectional view showing an example of the construction of the light-condensing block of the device shown in FIG. 2.

The aforementioned light-condensing block 1 may be formed by molding of a transparent material such as glass or plastics and can be simply manufactured by polishing or injection molding without the necessity of the bending work which has been required of conventional reflecting mirrors. Alternatively, the light-condensing block 1 may be formed by joining transparent members 9 and 10 as shown in FIG. 3. In this latter case, the transparent members 9 and 10 may be formed simply by making only one surface of a square pillar into an elliptical surface and the manufacture thereof is easier. Also, these transparent members 9 and 10, though depending on their performance required, may be approximated even by members obtained by cutting out pillar-like blanks at least a part of whose cross-section is circular. This is because the light converging accuracy required of an illuminating system, unlike a reading optical system, is generally not so severe.

Figure 4:
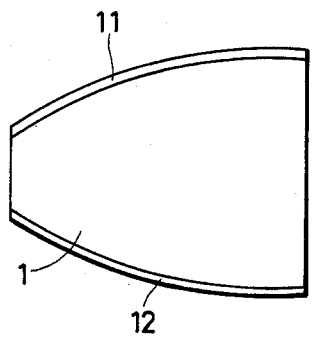
FIG. 4 is a cross-sectional view showing another example of the construction of the light-condensing block of the device shown in FIG. 2.

The outer peripheral surfaces 2 and 3 of the light-condensing block 1 may be coated with a reflective substance as by metal plating as required. Also, as shown in FIG. 4, a reflecting surface can be constructed by coating the outer peripheral surfaces 2 and 3 with substances 11 and 12 having a refractive index lower than that of the interior of the light-condensing block 1.

The light source 8 can be fixed to the end surface 4 and therefore, its position adjustment is easy and its assembling process can be simplified. A conventional fluorescent tube or the like may be used as the light source 8, but if a light-emitting diode (LED) array or a semiconductor laser (LD) array is used as the light source 8, it can be made with the end surface 4 of the light-condensing block 1 as a support, and this is advantageous in making the device compact.

The light source 8 need not always be installed on the focal point 6 because light is converged in a focal plane passing through the second focal point 7 if the light source is on a focal plane passing through the first focal point 6.

Figure 5:
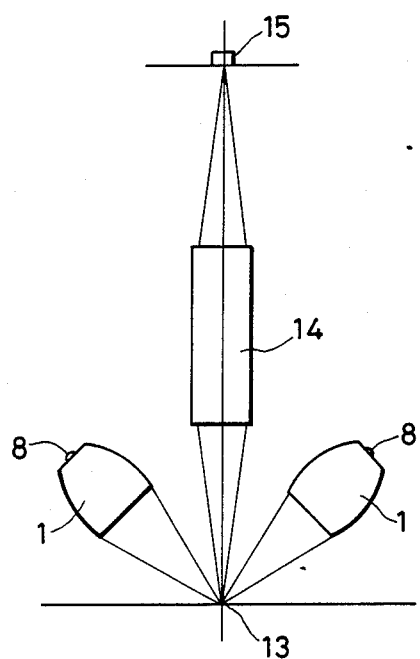
FIG. 5 is a cross-sectional view showing an embodiment in which the illuminating device of the present invention is applied to an original reading apparatus.

FIG. 5 shows an embodiment in which the illuminating device according to the present invention is applied to an original reading apparatus such as a copying apparatus or a facsimile apparatus. In FIG. 5, reference numeral 1 designates the light-condensing block as previously described. The light-condensing block 1 is disposed so that a straight line passing through the second focal point thereof and extending axially of the pillar member thereof is coincident with a straight line passing through a point 13 on the original and extending axially of the pillar member. Designated by 8 is the light source (such as an LED or LD array) arranged as previously described. Reference numeral 14 denotes a SELFOC lens array for projecting the reflected light from said straight line passing through the point 13 onto a sensor 15.

Thus, according to the present invention, there is provided an illuminating device which is compact and easy to manufacture and which is capable of forming a linearly extending high illumination illuminating area with a very good light-condensing effect, and such device is particularly effective for the illumination of an original in a copying apparatus or a facsimile apparatus.

What we claim is:

1. An illuminating device comprising:

a light-condensing block forming a transparent pillar member made of solid material having a greater refractive index than ambience and having a plurality of cross-sections each substantially forming a part of an ellipse having a first focal point and a second focal point, said block extending lengthwise in a predetermined direction perpendicular to said cross-sections and forming (1) a first line in said predetermined direction from a plurality of first focal points, and (2) a second line in said predetermined direction from a plurality of second focal points, said block having an external surface substantially coincident with said first line and extending in said predetermined direction; and a light source for illuminating an object disposed along the second line through said light-condensing block, said light source extending along said first line and directly fixed to said surface at a position where said surface is substantially coincident with said first line, so that said light source is imaged on the object as a linearly extending image produced along said second line.

2. An illuminating device according to claim 1, wherein said light-condensing block comprises two square pillars each having one surface thereof worked into a curved surface.

3. An illuminating device according to claim 1, wherein said light source comprises a light-emitting diode array or a semiconductor laser array fixed on an end surface of said light-condensing block.

4. An illuminating device according to claim 1, wherein the elliptical outer peripheral surface of said light-condensing block is coated with a substance having a refractive index lower than the refractive index of said light-condensing block.

5. An illuminating device according to claim 1, wherein the elliptical outer peripheral surface of said light-condensing block is coated with a reflective substance.

* * * * *